United States Patent [19]

Haake

[11] 4,114,834

[45] Sep. 19, 1978

[54] TAPE DRIVE SYSTEM AND ONE-WAY CLUTCH MECHANISM

[75] Inventor: Robert Haake, Torrance, Calif.

[73] Assignee: Phone-mate, Inc., Torrance, Calif.

[21] Appl. No.: 653,505

[22] Filed: Jan. 29, 1976

Related U.S. Application Data

[63] Continuation-in-part of Ser. No. 618,128, Sep. 30, 1975, abandoned.

[51] Int. Cl.² ............................ G03B 1/04; G11B 15/32
[52] U.S. Cl. ...................................... 242/200; 242/208; 360/91
[58] Field of Search ................................ 242/200–204, 242/206, 208–210; 360/91, 92, 74; 74/208, 215

[56] References Cited

U.S. PATENT DOCUMENTS

| | | | |
|---|---|---|---|
| 2,983,794 | 5/1961 | Shields | 242/208 |
| 3,133,710 | 5/1964 | Herterich | 242/201 |
| 3,587,997 | 6/1971 | Wood | 74/215 X |
| 3,610,553 | 10/1971 | Matsuyama | 242/206 |
| 3,883,893 | 5/1975 | Ueki | 360/74 |

*Primary Examiner*—Leonard D. Christian
*Attorney, Agent, or Firm*—Gardner and Anten

[57] ABSTRACT

An improved tape drive system for an apparatus (a telephone answering device in the exemplary, preferred embodiment of this invention) which employs one or more dual reel tape cassettes or cartridges. The tape drive system of the present invention requires only a single motor and a single solenoid for providing all operating functions of the apparatus. One lever (a broadcast lever) is pivotably mounted on a base or chassis and carries a broadcast pinch roller mechanism and a broadcast record/playback head. A second lever (an incoming call recording or "ICR" lever) is pivotably mounted on the first lever and carries an ICR pinch roller and an ICR record/playback head. The broadcast, ICR and rewind operating modes of the apparatus are provided by a single motor and a single solenoid.

A novel one-way clutch mechanism employs an eccentric disc or cam for camming the broadcast pinch roller out of engagement with the broadcast tape drive capstan during the rewind mode of operation of the apparatus, without the need of a separate solenoid.

A novel automatic ICR tape reversing mechanism is employed for driving the take-up reel of the ICR cassette during the ICR mode of the apparatus and for driving the supply reel of the ICR tape cassette during the rewind mode of the apparatus, without the need of separate solenoids.

7 Claims, 8 Drawing Figures

FIG. 1. (BROADCAST)

Fig. 2. (INCOMING CALL RECEIVING)

Fig. 3 (REWIND)

Fig. 4. (CASSETTE REMOVAL)

TAPE DRIVE SYSTEM AND ONE-WAY CLUTCH MECHANISM

RELATED APPLICATION

This application is a continuation-in-part of U.S. application Ser. No. 618,128, filed Sept. 30, 1975 and now abandoned.

FIELD OF THE INVENTION

The present invention is directed to tape drive systems which employ dual reel type recording tape cassettes or cartridges, and to one-way clutch mechanisms.

BACKGROUND OF THE INVENTION

There are numerous types of apparatuses on the market which employ dual reel types of magnetic recording tape cassettes or cartridges. One type of such apparatuses is an automatic telephone answering device.

Telephone answering devices typically employ two tape cassettes or cartridges. One of the cassettes or cartridges (i.e., a broadcast or "BC" cassette) carries a message which is played over a telephone to an incoming caller. The second cassette or cartridge (i.e., an incoming call recording or "ICR" cassette) is adapted to record a message from the caller which is later played back.

Telephone answering devices typically have three operating modes, i.e., (1) a broadcast mode during which the message on the broadcast tape is played to the caller, (2) an ICR mode during which a message from the caller is recorded (or played back), and (3) a rewind mode during which the ICR tape is rewound.

Where tape cassettes or cartridges are employed (in telephone answering devices or in other record and/or playback devices) it is necessary to provide the devices with drive capstans and pinch rollers for moving the tapes in the cassettes or cartridges past record/playback heads.

Prior to the advent of the present invention such apparatuses typically required one or two motors and/or three solenoids for selectively moving the various pinch rollers into and out of engagement with the drive capstans at the appropriate times, and for winding the incoming call recording tape reels in one direction or the other. In addition to the motors and solenoids, various cams, levers and other mechanical elements were employed to accomplish the desired and necessary functions of the apparatuses.

Thus, the prior art telephone answering devices and other recording and/or playback devices which employed one or more tape cassettes or cartridges have been characterized by the use of costly and cumbersome electrical components and mechanical elements.

SUMMARY OF THE PRESENT INVENTION

In view of the foregoing, it is an object of the present invention to provide an improved tape drive system for apparatuses employing dual reel tape cassettes and/or cartridges which is less costly, less complex and less cumbersome than prior art tape drive systems have been.

It is a further object of the present invention to provide a novel one-way clutch mechanism which automatically cams or moves a pinch roller (or other mechanism, such as a gear wheel, for example) out of driving engagement with the drive capstan (or other mechanism, such as another gear, for example) when the record and/or playback mechanism in which it is incorporated is operating in a reverse or rewind mode.

Another object of the present invention is to provide a novel automatic reversing mechanism for a reel-to-reel tape cassette or cartridge which automatically winds the take-up reel when the mechanism in which it is incorporated is operating in one mode, winds the supply reel when the mechanism operates in a second mode, and which may be positioned in a neutral position when the mechanism is operating in a third mode.

A further object of the present invention is to provide an improved telephone answering device which utilizes an endless loop type broadcast tape cassette or cartridge and an incoming call recording cassette or cartridge and which requires only a single reversible motor and a single solenoid for operating the device in its three modes of operation (i.e., broadcast mode, incoming call recording mode and rewind mode).

The foregoing and other objects, novel features and advantages of the present invention have been realized by providing an apparatus having a base or chassis for supporting one or more tape containers (i.e., cassettes or cartridges). Tape drive flywheels and upstanding tape drive capstans are connected to the chassis. A reversible motor and belt drive mechanism is provided for operating the tape drive flywheels and capstans and a novel automatic reversible mechanism which selectively drives the take-up reel or the supply reel of a reel-to-reel tape container (depending on the direction that the motor and belt drive mechanism is operating). A novel one-way clutch mechanism is provided for drivingly engaging the drive capstan for an endless loop type tape container only when the motor and belt drive mechanism is operating in one direction. A lever and spring assembly is mounted on the base or chassis for supporting record/playback heads and pinch rollers for selectively driving either the tape in the endless loop type container or the tape in the reel-to-reel type container. A single solenoid selectively actuates the lever and spring assembly during the various modes of operation of the apparatus.

Numerous other objects, novel features and advantages of the present invention will be realized from the following detailed description of a preferred embodiment of the invention. It is to be understood at the outset, however, that while the following description of preferred embodiments of the invention is directed to utilization of the present invention in connection with a telephone answering mechanism, several features and novel mechanisms of the invention may be employed in various other types of apparatuses which employ or require tape drive mechanisms and/or other mechanisms (including, for example, machinery).

DETAILED DESCRIPTION OF PREFERRED EMBODIMENTS

As shown in each of FIGS. 1 through 4, the telephone answering device 10 of the present invention includes a reversible motor 12 which is mounted on a chassis 14.

The chassis 14 of the telephone answering device 10 of the present invention may be considered as having two stations, namely, a broadcast station 16 for supporting an endless or continuous loop type broadcast tape cassette 18 and components associated therewith, and an incoming call or message recording (ICR) station 20 for supporting a reel-to-reel type of incoming call recording (ICR) tape cassette 22 and components associated therewith.

The reversible motor 12 includes a drive shaft pulley 24 which drives an endless loop type of drive band 26. The drive band 26 is wrapped around the drive shaft pulley 24, a broadcast station flywheel 28, an incoming call recording station flywheel 30 and a drive wheel or pulley 32 on an automatic reversing mechanism 34 (described in detail hereinafter) associated with the take-up and supply spindles 84 and 86, respectively, and turntables 85 and 87 for driving the take-up and supply reels (not shown) of the incoming call recording (ICR) tape cassette 32.

The broadcast station flywheel 28 is fixedly mounted on a broadcast drive capstan shaft 36. Similarly, the incoming call flywheel 30 is fixedly mounted on an incoming call drive capstan 38.

A broadcast lever 40, generally in the shape of a right angle, is pivotably connected to the chassis 14 by means of a pivot pin 42. One arm of the lever 40 carries a record/playback head 44 and a novel broadcast pinch roller mechanism 46.

The novel one-way clutch mechanism 46 includes an upstanding shaft 48 mounted on the lever 40, a broadcast pinch roller 50 mounted on the shaft 48 and an eccentric disc or cam 52 mounted on top of the pinch roller 50 and connected thereto by means of a spring washer which provides light frictional engagement between the pinch roller and the eccentric disc. In the embodiment of the novel one-way clutch mechanism 46 shown in FIGS. 1 through 4, the eccentric disc or cam 52 is provided with a radially outwardly extending arcuate section 54 for limiting the rotational movement of the eccentric disc or cam 52 to approximately 270°.

Figure 3:
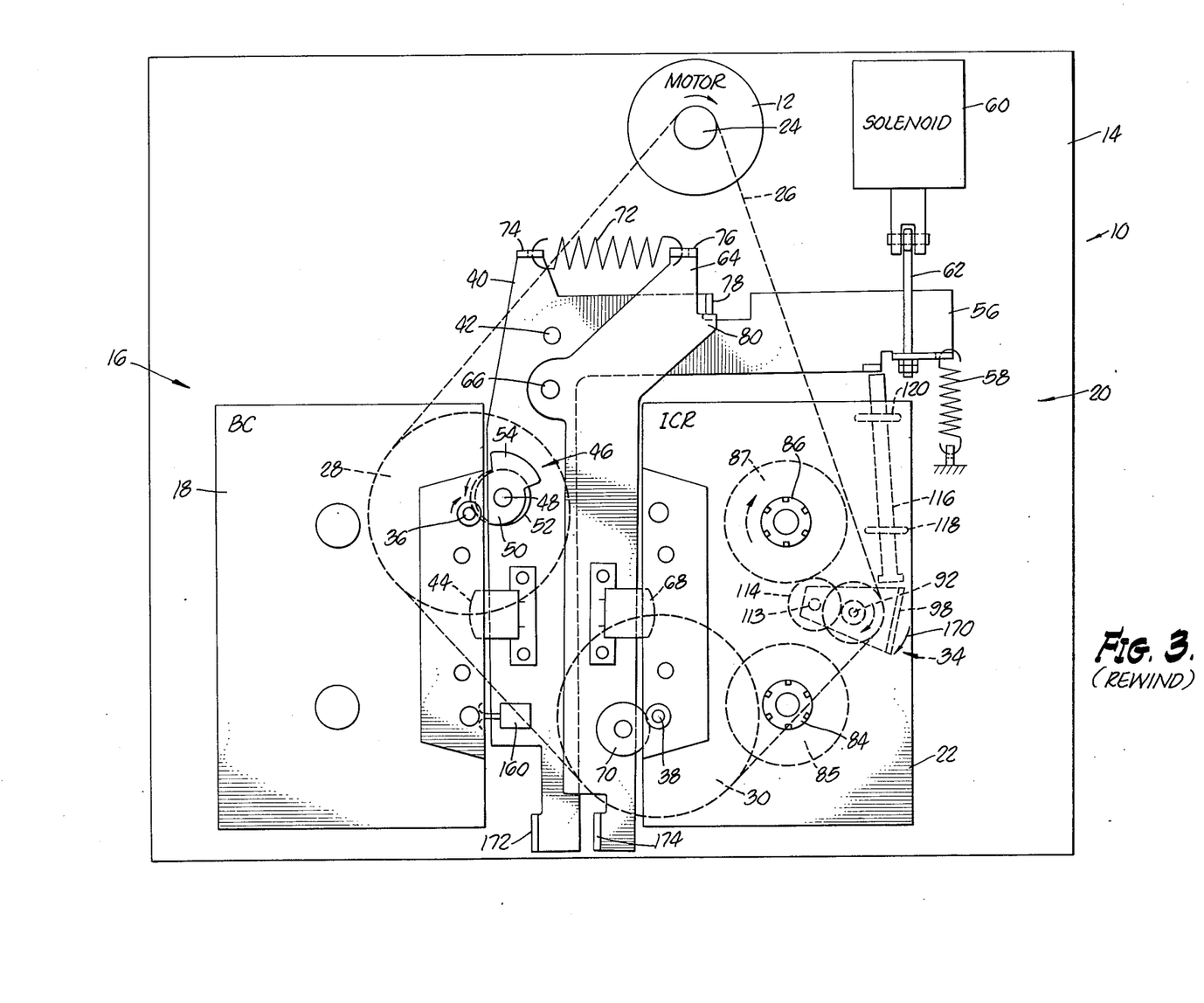
FIG. 3 is a top plan view similar to FIGS. 1 and 2, showing the telephone answering device of FIGS. 1 and 2 with the various components and mechanisms of the device being shown in the positions they occupy during the rewind mode of operation of the device.

As described more fully hereinafter, the eccentric disc or cam 52 functions, when the motor 12 is operating in a reverse (i.e., clockwise direction, as indicated in FIG. 3) to separate the broadcast pinch roller 50 from driving engagement or contact with the broadcast drive capstan 36 to thereby prevent reverse (i.e., clockwise) movement of the continuous broadcast tape (not shown) in the broadcast tape cassette 18 when the motor 12 is operating in a reverse (i.e., clockwise) direction.

It is contemplated that the novel one-way clutch mechanism 46 may be used in mechanisms (such as machinery, for example) other than tape drive systems. By way of example only, the novel one-way clutch mechanism may be employed to selectively engage and disengage two gears for movement in a clockwise or counterclockwise direction, depending upon the direction of operation of the motor of the machinery.

Figure 1:
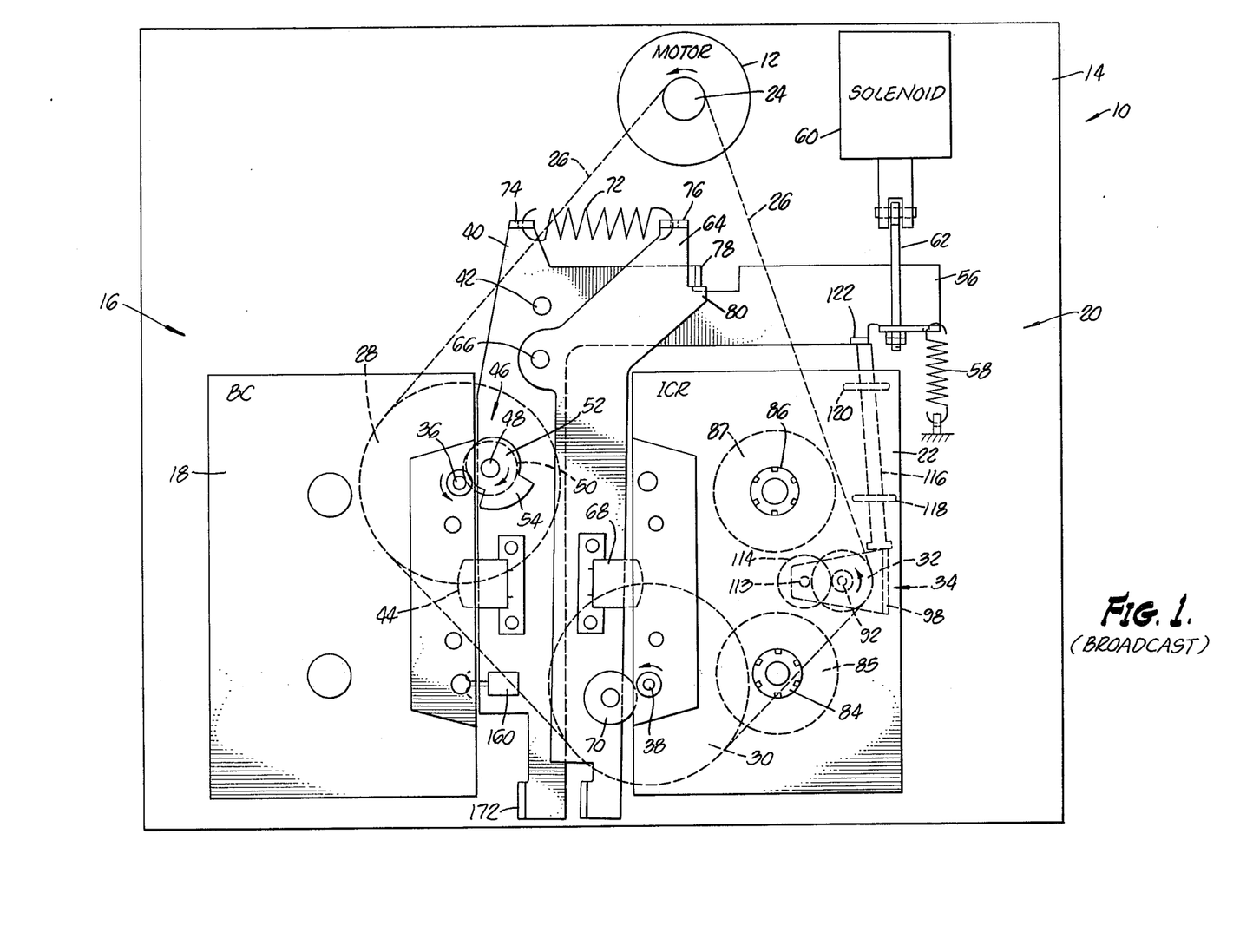
FIG. 1 is a top plan view of a telephone answering device incorporating the various novel and inventive features of the present invention, the various components and mechanisms of the telephone answering device being shown in the positions they occupy during the broadcast mode of operation of the device.

The other arm of the broadcast lever 40 (i.e., the arm which does not carry the record/playback head 44 and the broadcast pinch roller mechanism 46) has its outer end 56 spring biased into the position shown in FIG. 1 by means of a tension spring 58.

A solenoid 60 is connected to the outer end 56 of the lever 40 by means of an actuator arm 62. The solenoid 60, when actuated, will rotate the lever 40 in a counterclockwise direction about pivot pin 42 from the position shown in FIG. 1 to the position shown in FIG. 2, against the force of the tension spring 58.

A second or ICR lever 64 is pivotably connected to the broadcast lever 40 by means of a pivot pin 66. The second lever 64 carries an ICR record playback head 68 and an ICR pinch roller 70 thereon.

A tension spring 72 connected between an upstanding tab 74 on the broadcast lever 40 and an upstanding tab 76 on the ICR lever 64 normally biases the ICR lever 64 into the position shown in FIG. 1. In this position (i.e., the position of the ICR lever 64 shown in FIG. 1) the ICR pinch roller 70 is out of contact or out of engagement with the ICR drive capstan 38 for the ICR tape (not shown) in the incoming message receiving tape cassette 22. An upstanding tab 78 on the broadcast lever 40 serves as a stop and cooperates with an outwardly extending tab 80 on the ICR lever 64 to maintain the ICR lever 64 in the position shown in FIG. 1 wherein the ICR pinch roller 70 is out of contact and out of engagement with the ICR drive capstan 38.

As shown in FIGS. 1 through 4, a take-up spindle 84, a take-up turntable 85, a supply spindle 86 and a supply turntable 87 are provided for driving the take-up and supply reels (not shown) in the reel-to-reel ICR cassette 22.

Figures 5, 6, 7, 8:
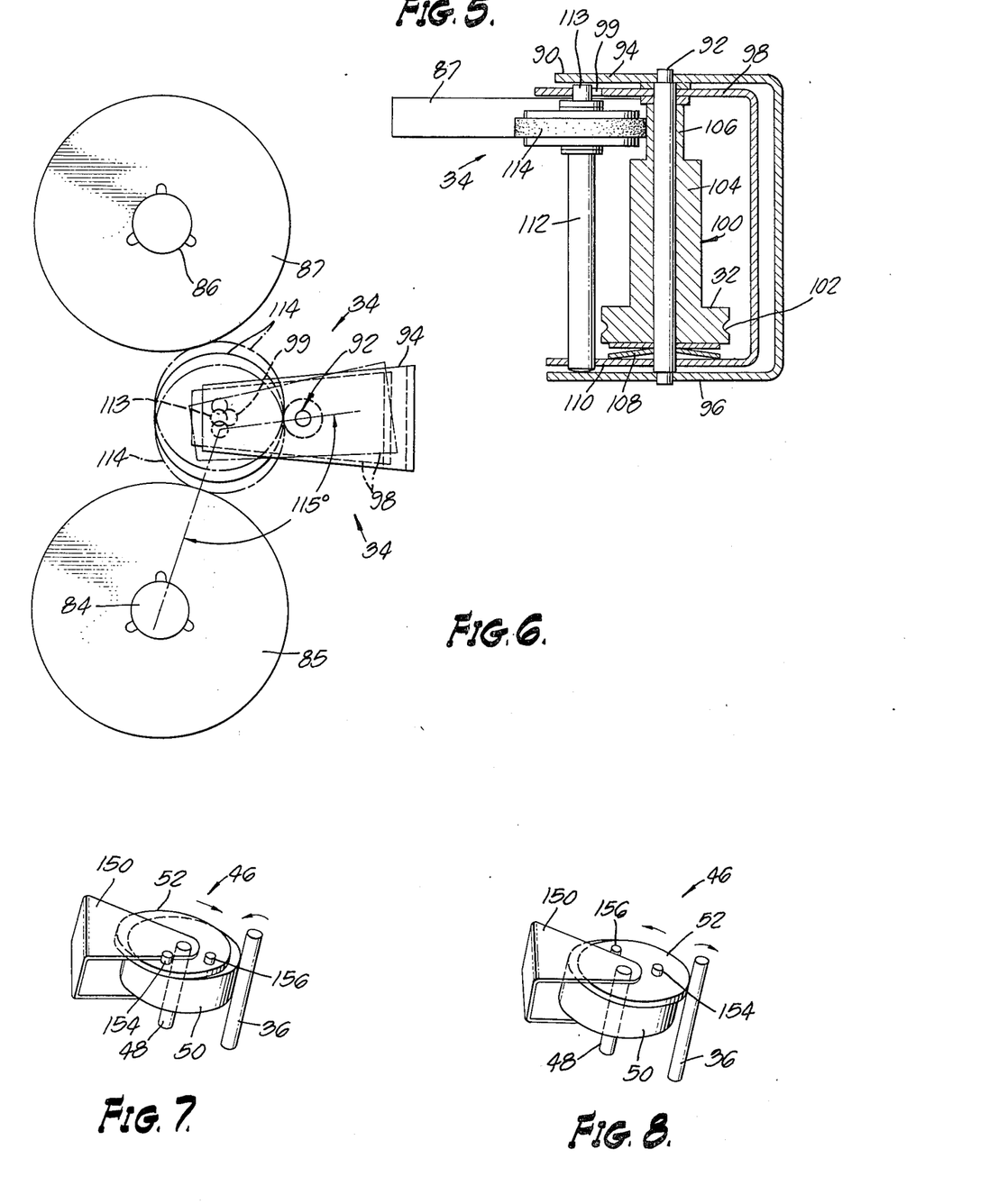
FIG. 5 is a side elevation view showing the novel automatic tape reversing mechanism of the present invention.
FIG. 6 is a top plan view showing the mode of operation of the automatic tape reversing mechanism illustrated in FIG. 5.
FIG. 7 is a perspective view showing the novel one-way clutch mechanism of the present invention with the broadcast pinch roller in driving engagement with the broadcast drive capstan.
FIG. 8 is a perspective view of the novel one-way clutch mechanism of the present invention showing the broadcast pinch roller being cammed out of engagement with the broadcast drive capstan.

The novel automatic reversing mechanism 34 which is adapted to selectively drive the take-up turntable 85 during the incoming call recording mode (illustrated in FIG. 2) and the supply turntable 87 during the rewind mode (shown in FIG. 3) is best illustrated in FIGS. 5 and 6.

As best shown in FIGS. 5 and 6, the novel automatic reversing mechanism 34 of the device of the present invention includes an outer bracket 90 which is fixedly mounted on the chassis 14 (not shown in FIGS. 5 and 6). The outer bracket 90 is generally C-shaped and has a pulley shaft 92 mounted therein between its upper arm 94 and its lower arm 96.

Rotatably mounted on the pulley shaft 92 is an inner bracket 98, which is also generally C-shaped, and a pulley 100. The pulley 100 includes a lower portion 32 which has a circumferential notch or groove 102 therein, an upwardly extending central portion 104 and a reduced diameter upper portion 106.

The circumferential groove or notch 102 in the lower portion 32 of the pulley 100 is adapted to receive the drive belt 26 (not shown in FIGS. 5 and 6) which is driven by the drive shaft pulley 24 (FIGS. 1-4). Friction is provided between the inner bracket 94 and the lower portion 32 of the pulley 100 by means of a spring washer 108 located between the inner surface of the lower arm 110 of the inner bracket 98 and the bottom surface of the lower portion 32 of the pulley 100.

A shaft 112 is rotatably mounted between the upper and the lower arm of the inner bracket 98 and carries a rubber tire idler 114 on the upper end thereof.

Thus, it can be seen that when the pulley 100 is rotated by means of the drive belt 26 (not shown in FIGS. 5 and 6), two separate actions will take place. Initially, the inner bracket 98 will be pivoted about shaft 92 to bring the idler wheel 114 into engagement with either the take-up turntable 85 or the supply turntable 87, and thereafter rotation of the pulley 100 will cause rotation of the rubber tire idler 114 (by means of its frictional engagement with the upper end 106 of the pulley) to rotate the take-up turntable 85 or the supply turntable 87 which the idler 114 engages. It will be appreciated, of course, that rotation of the take-up turntable 85 and spindle 84 will rotate the take-up reel (not shown) in the ICR cassette 22, and rotation of the supply turntable 87 and the supply spindle 86 will rotate the supply reel (not shown) in ICR cassette 22.

As shown in FIG. 5, the upper end 113 of the shaft 112 is of reduced diameter, compared to the remainder of shaft 112, thereby providing an annular shoulder (not seen) on the shaft 112 on which the rubber tire idler is supported.

As shown in FIGS. 5 and 6, the reduced diameter upper end 113 of the shaft 112 extends through a slot 99 in the upper arm of the inner bracket 98. This arrangement renders the reduced diameter end 113 "free floating" in the slot 99 so that the rubber tire idler 114 can be squeezed and compressed between the upper portion 106 of the pulley 100 and either the turntable 85 (when the automatic reversing mechanism 34 is pivoted in a counterclockwise direction as in FIG. 2) or the turntable 87 (when the automatic reversing mechanism 34 is pivoted in a clockwise direction as in FIG. 3). This arrangement permits the rubber tire idler 114 to impart greater rotational torque to the turntables 85 and 87 and protects against any possible slippage between the upper end 106 of the pulley 100, the rubber tire idler 114 and the turntables 85 and 87.

Figure 2:
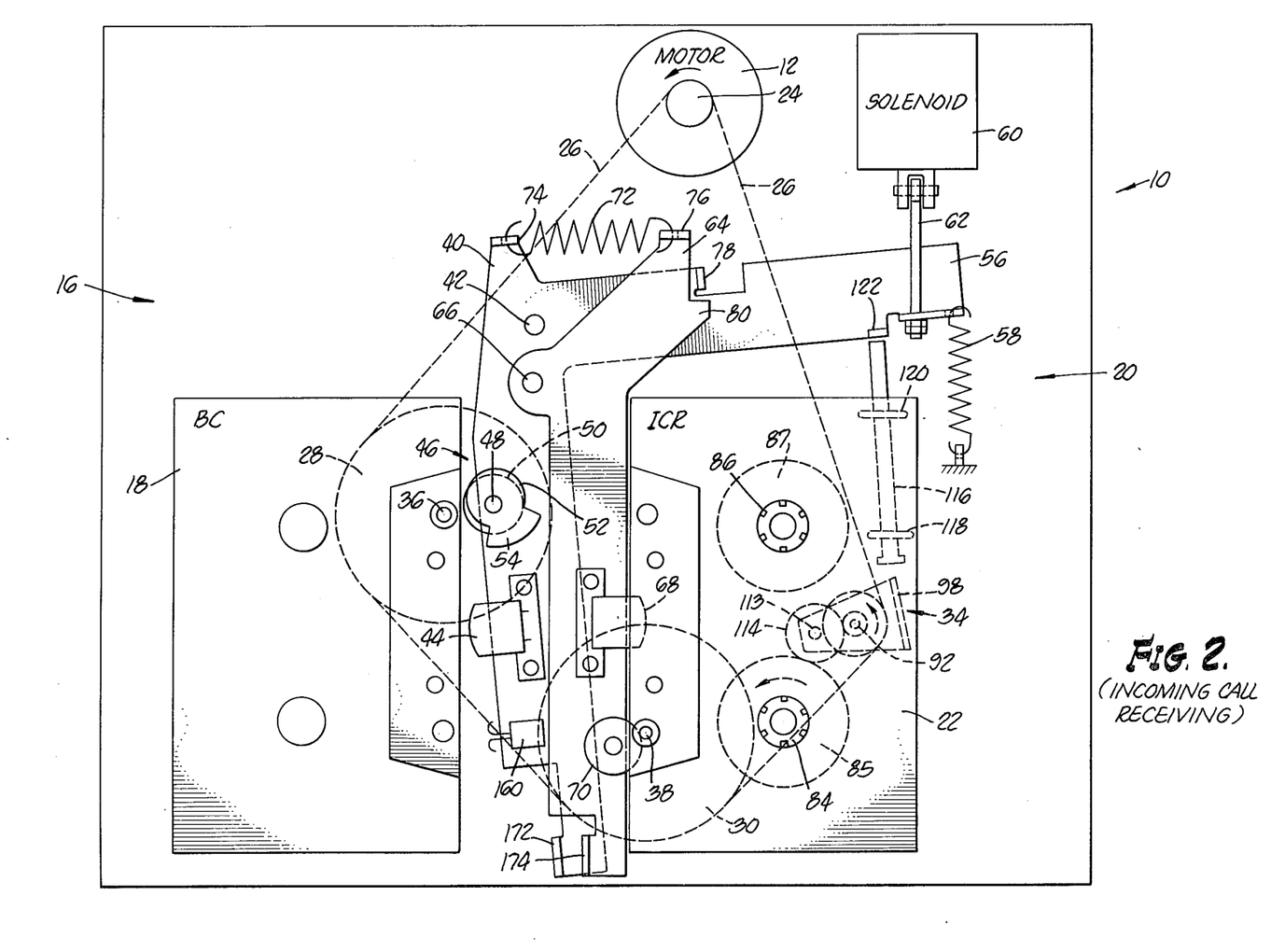
FIG. 2 is a top plan view, similar to FIG. 1, showing the telephone answering device of FIG. 1 with the various components and mechanisms of the device being shown in the positions they occupy during the incoming call receiving (ICR) mode of operation of the device.

The rubber tire idler 114 will be moved into engagement with the take-up turntable 85, as shown in FIG. 2, when the motor 12 is rotating in a counterclockwise direction; and the rubber tire idler 114 will be moved into engagement with the supply turntable 87, as shown in FIG. 3, when the motor 12 is operating in a reverse, rewind or clockwise direction.

As best shown in FIGS. 1 through 4, a pushrod 116 is slidably mounted in brackets 118 and 120 which are attached to the chassis 14. As shown in FIG. 1, during the broadcast mode, one end of the pushrod 116 engages an upstanding tab 122 on the outer end of one arm of the broadcast lever 40 and the other end of the push rod 116 engages or abuts against the inner bracket 98 of the automatic reverse mechanism 34 to prevent the inner bracket 98 (and, hence, the idler wheel 114) from pivoting in a counterclockwise direction when the motor 12 is operating in a counterclockwise direction. Thus, in the broadcast mode (FIG. 1), the idler wheel 114 is held in a central or neutral position between the take-up turntable 85 and the supply turntable 87 to prevent it from causing rotation of either of these turntables.

During the incoming message or call recording mode (illustrated in FIG. 2) when the solenoid 60 has rotated the broadcast lever 40 about pivot pin 41 in a counterclockwise direction, the inner bracket 98 and the idler wheel 114 are free to pivot in a counterclockwise direction to bring the idler wheel 114 into driving engagement with the take-up turntable 85. In this mode, i.e., the incoming message or call recording mode, the idler wheel 114 will rotate in a counterclockwise direction to drive the take-up turntable 85 and the take-up reel (not shown) in the ICR cassette 22 in a clockwise direction.

It should be noted that the take-up turntable 85 is provided with a clutch mechanism (not shown) so that it will not rotate if it meets with a significant degree of resistance to rotation.

As best shown in FIG. 3, when the motor 12 is rotating in a reverse or clockwise or "rewind" direction, the drive belt 26 will pivot the inner bracket 98 of the automatic reversing mechanism 34 in a clockwise direction to bring the idler wheel 114 into driving engagement with the supply turntable 87. Thereafter, continued rotation of the idler wheel 114 in a counterclockwise direction will cause the supply turntable 87 and the supply spindle 85 to rotate in a clockwise direction, as shown by the arrow in FIG. 3.

FIGS. 7 and 8 illustrate the manner which the novel one-way clutch mechanism of the device of the present invention operates. It is to be noted at the outset that the one-way clutch mechanism 46 shown in FIGS. 7 and 8 differs from the one-way clutch mechanism shown in FIGS. 1 through 4 only in the means for limiting rotation of the eccentric disc or cam 50 to approximately 270°.

Referring to FIGS. 7 and 8, the novel one-way clutch mechanism 46 includes a pinch roller 50 and a shaft 48 on which the pinch roller 50 is mounted.

A bracket 150 is connected to the shaft 48 for the purpose of limiting rotation of the eccentric disc or cam 52. Rotational movement of the eccentric disc or cam 52 is limited to approximately 270° by means of upstanding stop members 154,156 provided on the upper surface of the eccentric disc or cam 52 which engage the upper arm of the bracket 150.

The novel one-way clutch mechanism 46 is provided for the purpose of disengaging the broadcast pinch roller 50 from the broadcast drive capstan 36 when the telephone answering device 10 is operating in a rewind mode (FIG. 3). When the motor 12 and the drive band 26 are rotating in a reverse or "rewind" or clockwise direction, as shown in FIG. 3, the novel one-way clutch mechanism 46 of the present invention will disengage the pinch roller 50 from the drive capstan 36 and move it out of driving contact therewith (see FIG. 8) so that the endless loop broadcast tape (not shown) in the broadcast tape cassette 18 will not be engaged or rewound.

The foregoing function is accomplished in the following manner. As shown in FIG. 7, when the broadcast drive capstan 36 (which is attached to the broadcast flywheel 28 for rotation therewith) is driven in a forward or counterclockwise direction by the motor 12 and the drive band 26, the broadcast tape (not shown) will be firmly engaged between the drive capstan 36 and the pinch roller 50 to drive the broadcast tape (not shown).

It will be noted that counterclockwise rotation of the broadcast drive capstan 36 (as shown in FIG. 7), caused by counterclockwise or forward rotation of the motor 12, the drive band 26 and the broadcast flywheel 28 on which the upstanding broadcast drive capstan 36 is mounted, will cause clockwise rotation of the pinch roller 50, also as shown in FIG. 7. A spring washer (not shown) is provided between the eccentric disc or cam 52 and the pinch roller 50 to provide light frictional engagement therebetween so that the eccentric disc or cam 52 will also rotate in a clockwise direction (FIG. 7) with the pinch roller 50 until the upstanding stop member 154 engages the upper arm of the bracket 150. Thereafter, because the spring washer (not shown) provides only slight frictional engagement between the eccentric cam 52 and the pinch roller 50, the eccentric disc 52 will remain in the position shown in FIG. 7 while the pinch roller 50 continues to rotate in a clockwise direction and cooperates with the drive capstan 36 to drive the continuous band type of broadcast tape (not shown) in the broadcast tape cassette 18.

In the rewind mode (FIG. 3) of the telephone answering device 10, when the motor 12 is operated in a reverse or clockwise direction so as to rewind the incoming call recording tape (not shown) in the ICR tape cassette 22, the broadcast flywheel 28 and the broadcast drive capstan 36 which is mounted on the flywheel 28 will also be rotated in a clockwise direction, as illustrated by the arrow in FIG. 8. This will cause the broadcast pinch roller 50 and the eccentric disc 52 (which is connected to the pinch roller 50 by means of a spring washer (not shown) to provide slight frictional engagement therebetween) to rotate in a counterclockwise direction as shown by the arrow in FIG. 8. As the eccentric disc or cam 52 rotates in a counterclockwise direction, it will move or cam the pinch roller 50 out of engagement with the broadcast drive capstan 36 so that the broadcast tape (not shown) in the broadcast tape cassette 18 will not be moved. This is shown by the space between the pinch roller 50 and the broadcast drive capstan 36 in FIG. 8. The eccentric disc or cam 52 will stop and remain in the position shown in FIG. 8 (wherein the pinch roller remains spaced from the broadcast drive capstan 36) because of the engagement of the upstanding stop member 156 with the upper arm of the bracket 150.

It is again pointed out that the novel one-way clutch mechanism 46 shown in FIGS. 7 and 8 is identical to the novel pinch roller mechanism 46 shown in FIGS. 1 through 4, except for the stop means for limiting rotational movement of the eccentric disc or cam 52 to approximately 270°. More specifically, in the embodiment shown in FIGS. 7 and 8, the stop means for limiting rotational movement of the eccentric disc or cam 52 are the upstanding stop members 154 and 156 and the bracket 150. The means for limiting rotational movement of the eccentric cam or disc 52 shown in the embodiment of FIGS. 1 through 4 is the radially outwardly extending arcuate section 54 and a pair of upstanding stop pins or members (not shown) which the sides of the radially outwardly extending arcuate section 54 are adapted to engage.

OPERATION

Operation of the improved telephone answering device 10 of the present invention may best be understood by considering that the telephone answering device 10 has three operating modes, namely:

(1) A broadcast mode (illustrated in FIG. 1);
(2) An incoming message or call recording mode (illustrated in FIG. 2); and
(3) A rewind mode (illustrated in FIG. 3).

Broadcast Mode

When a call comes in to the telephone answering device 10 a suitable telephone ring detector mechanism (not shown; conventional per se) starts the motor 12 rotating in a forward or counterclockwise direction, as shown in FIG. 1. This causes the motor shaft 24 and the drive band 26 to rotate in a counterclockwise direction. The drive band, in turn, which is wrapped around a portion of the broadcast flywheel 28 is also rotated in a counterclockwise direction, thereby rotating the broadcast drive capstan 36 in a counterclockwise direction. Since the broadcast drive capstan 36 is in engagement with the pinch roller 50, the broadcast drive capstan 36 and the pinch roller 50 will cooperate, in a manner conventional per se, to drive the broadcast tape (not shown) in the broadcast tape cassette 18 past the record/playback head 44, thereby broadcasting a message over the telephone to the caller.

It will be noted that since the tension spring 58 biases the broadcast lever 40 in the position shown in FIG. 1, and because the outwardly extending tab 80 on the second lever 64 engages the upstanding stop tab 78 on the broadcast lever 40, the pinch roller 70 on the second lever 64 will remain out of engagement and spaced from the ICR (incoming call recording) capstan 38 which is mounted on the ICR flywheel 30. Accordingly, the incoming call recording tape (not shown) in the incoming call recording tape cassette 22 will not be moved during the broadcast mode. In this connection it is also to be noted that the pushrod 116 has one of its ends engaging the upstanding stop tab 122 on the broadcast lever 40 and the other of its ends engaging the inner bracket 98 on the novel automatic reversing mechanism 34 to maintain the mechanism 34 in the central position shown in FIG. 1 wherein the rotating rubber tire idler wheel 114 does not engage either the take-up turntable 85 or the supply turntable 87.

Incoming Call Recording (ICR) Mode

After the message on the broadcast tape (not shown) in the broadcast tape cassette 18 has been played to the caller suitable means (e.g., conductive foil) on the endless or continuous loop broadcast tape (not shown) will pass and close a foil sensor contact mechanism 160 which is also mounted on the broadcast lever (or the first lever) 40. Closing of the foil sensor contact switch 160 energizes the solenoid 60 to retract the solenoid lever 62 and move the broadcast lever 40 in a counterclockwise direction about pivot pin 42 to the position shown in FIG. 2.

It is to be noted that the motor 12, the motor shaft 24 and the drive belt 26, as well as the flywheels 28 and 30 and the drive pully 32 of the automatic reversing mechanism 34, continue to rotate in a forward or counterclockwise direction, as indicated by the arrow on the motor 12 in FIG. 2.

From viewing FIG. 2, it will be noted that when the solenoid actuator rod 62 is retracted to rotate the broadcast lever 40 to the position shown in FIG. 2, the one-way clutch mechanism 46, including the pinch roller 50 is disengaged or moved away from the broadcast drive capstan 36. Thus, the endless loop broadcast tape (not shown) in the broadcast tape cassette 18 will not be moved during the incoming call recording mode.

As the solenoid actuator rod 62 retracts and moves the broadcast lever 40 in a counterclockwise direction to the position shown in FIG. 2, the stop tab 78 on the broadcast lever 40 is also rotated to permit the tension spring 72 to rotate the second or ICR lever 64 in a counterclockwise directon, about the pivot pin 66, to the position shown in FIG. 2 wherein the ICR pinch roller 70 is moved into engagement with the ICR drive capstan 38. Thus, as the ICR drive capstan 38, which is mounted on the ICR flywheel 30 rotates in a counterclockwise direction (as shown by the arrow in FIG. 2), it will cooperate with the ICR pinch roller 70 with which it is in contact to drive the ICR tape (not shown) in the ICR cassette 22.

At the same time, with the ICR lever 64 in the position shown in FIG. 2 the record/playback head 68 will be in contact with the ICR tape (not shown) so that the incoming message from the caller will be recorded on the ICR tape.

It is also to be noted that when the solenoid actuator rod 62 is retracted to the position shown in FIG. 2, the free-floating pushrod 116 no longer restrains movement of the novel automatic reversing mechanism 34. Accordingly, the torque applied to the inner bracket 98 (FIG. 5) of the automatic reversing mechanism 34, via the action of the counterclockwise moving drive band 26 on the drive wheel portion 32 of pulley 100 will cause the inner bracket 98 and the rotating rubber tire idler wheel 114 to pivot in a counterclockwise direction to the position shown in FIG. 2. In this position, the drive pulley 32, through the idler wheel 114, will turn the take-up turntable 85 in a counterclockwise direction to turn the take-up reel (not shown) in the ICR tape cassette 22. As the rubber tire idler 114 engages the turntable 85 it will be squeezed or compressed between the turntable 85 and the upper end 106 of the drive pulley 100 and, as noted above, the free floating reduced diameter portion 113 of the shaft 112 on which the idler 114 is mounted may move somewhat rearwardly (i.e., toward the drive pulley 100) to facilitate the compressive action on the idler 114 and ensure against rotational slippage.

After the incoming message is received (i.e., after a predetermined time, such as 30 seconds or after a suitable voice-end sensing mechanism, not shown, is actuated), the solenoid 60 is de-energized and the tension spring 58 will pull the broadcast lever 40 in a clockwise direction, back to the position shown in FIG. 1. At the same time, as a result of the foregoing, the broadcast pinch roller 50 will again be moved into engagement with the broadcast drive capstan 36, the stop tab 78 will move in a clockwise direction against the outstanding tab 80 on the ICR lever 64 to move the pushrod 116 downwardly (as viewed in FIG. 1) to the position shown in FIG. 1 to move the automatic reversing mechanism 34 to the neutral or central position shown in FIG. 1, the motor will be stopped (by a suitable mechanism, not shown) wherein the telephone answering device 10 will be shut off and ready for the next call.

Rewind Mode

FIG. 3 illustrates the positions of the various components of the improved telephone answering device 10 of the present invention during the rewind mode of the device; that is, during the time the ICR tape (not shown) in the ICR cassette 22 is being rewound.

To rewind the ICR tape (not shown) in the ICR cassette, the motor switch (not shown) for the motor 12 is actuated to drive the motor 12 and the motor shaft 24 in a reverse, or rewind, or clockwise direction, as indicated by the arrow on the motor in FIG. 3.

During the rewind mode, as shown in FIG. 3, the solenoid 60 is not energized.

Rotation of the motor 12 and the motor shaft 24 in a reverse or clockwise direction causes the drive belt 26, the drive wheel 32 of pulley 100 of the automatic reversing mechanism 34, the ICR pulley 30 and the broadcast pulley 28 to rotate in a clockwise direction.

For the reasons explained above in connection with the novel one-way clutch mechanism 46 (shown in detail in FIGS. 7 and 8), when the broadcast drive capstan 36 is rotated in a clockwise direction (as indicated by the arrow in FIG. 3) the eccentric disc or cam 52 (which is connected to the broadcast pinch roller 50 by means of a spring washer) will cam the pinch roller 50 away from and out of engagement with broadcast drive capstan 36. As a result, the broadcast tape (not shown) in the broadcast tape cassette 18 will not be driven during the rewind mode.

Referring now to the automatic reversing mechanism 34 in FIG. 3, it will be noted that the movement of the drive band 26 in a clockwise direction will first cause the inner bracket 98 of the rewind mechanism to pivot about shaft 92 in a clockwise direction as indicated by the arrow 170 in FIG. 3. This clockwise pivoting of the inner bracket 98 of the automatic reversing mechanism 34 will bring the counterclockwise-rotating rubber tire idler wheel 114 into engagement with the supply turntable 87 in the ICR cassette 22 to cause the supply spindle 86 and the supply reel (not shown) in the ICR cassette 22 to rotate in a clockwise direction (as shown by the arrow on the supply turntable 87 in FIG. 3) to rewind the ICR tape (not shown) in the ICR cassette 22. As the rubber tire idler 114 engages the turntable 87 it will be squeezed or compressed between the turntable 87 and the upper end 106 of the drive pulley 100 and, as noted above, the free floating reduced diameter portion 113 of the shaft 112 on which the idler 114 is mounted may move somewhat rearwardly (i.e., toward the drive pulley 100) to facilitate the compressive action on the idler 114 and ensure against rotational slippage.

A built-in clutch (not shown) associated with the take-up turntable 85 prevents breakage of the ICR tape (not shown) and also prevents stalling of the motor 12.

A motion sensor (not shown; e.g., in the form of a leaf-switch) is pulsed by the supply turntable 87 or spindle 86 to shut off the motor 12 when the ICR tape (not shown) is rewound, or when the direction of the motor 12 reverses (as, for example, if an incoming call is received during the rewind mode).

Cassette Removal

Figure 4:
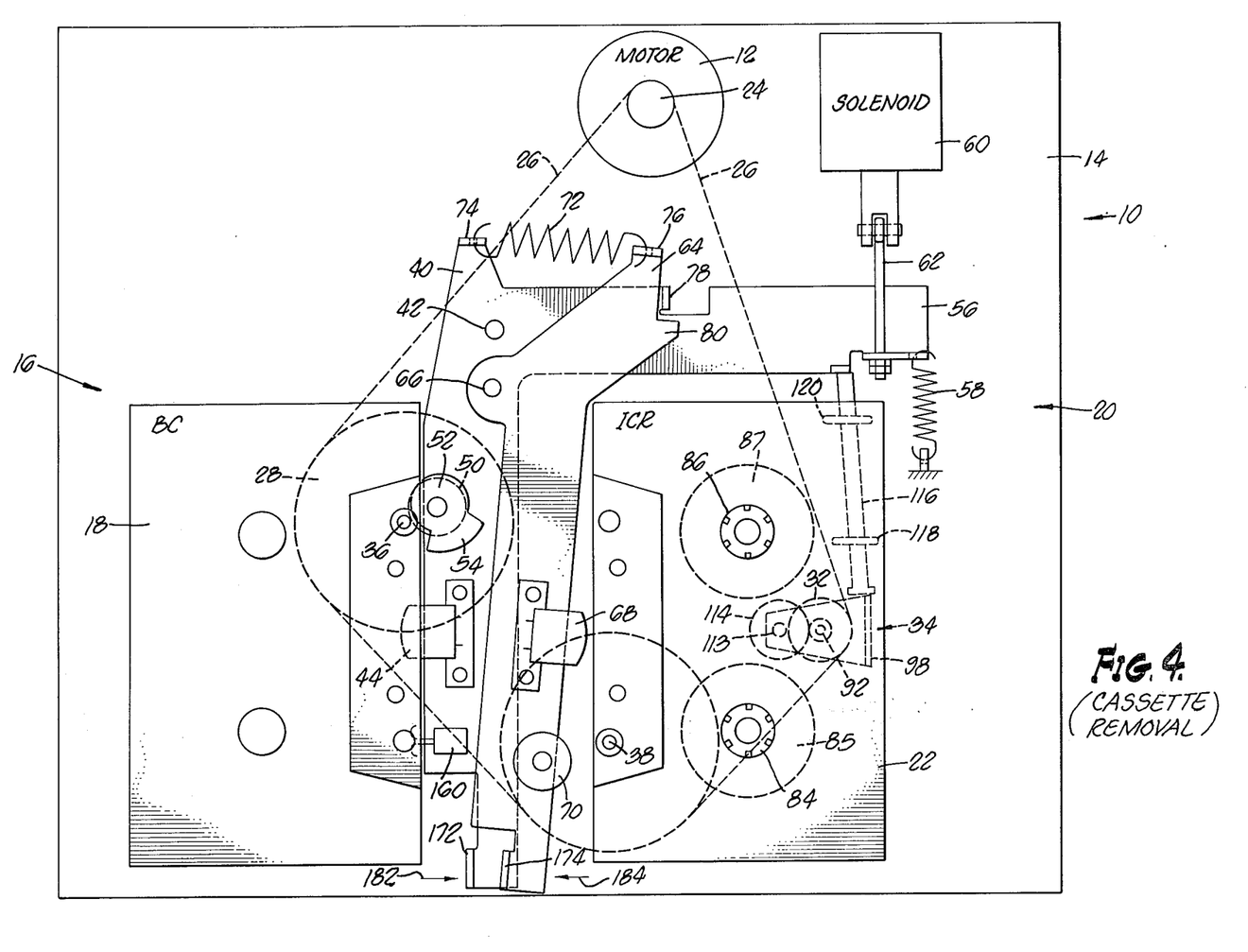
FIG. 4 is a top plan view, similar to FIGS. 1, 2 and 3, showing the telephone answering device of FIGS. 1, 2 and 3 with the various components and mechanisms of the device being shown in the positions they occupy when it is desired to remove the broadcast and/or ICR tape cassettes from the device.

As shown in each of FIGS. 1 through 4, the bottom portion of the broadcast lever 40 is provided with an upstanding thumb or finger tab 172, and the bottom of the ICR lever 64 is also provided with an upstanding thumb or finger tab 174. These thumb or finger tabs 172 and 174 are provided to facilitate removal of the broadcast tape cassette 18 and the ICR tape cassette 22, as illustrated in FIG. 4.

To remove the broadcast tape cassette 18 the user simply pushes the tab 172 on the bottom of the broadcast lever 40 to the right, as shown by the arrow 182 in FIG. 4. This will pivot the broadcast lever 40 in a counterclockwise direction about the pivot pin 42 a sufficient distance away from the broadcast tape cassette 18 to allow removal of the cassette from the chassis 14.

Similarly, in order to remove the ICR tape cassette 22, the user simply moves the upstanding tab 174 on the bottom of the ICR lever 64 to the left, as indicated by the arrow 184 in FIG. 4, to pivot the ICR lever 64 about the pivot pin 66 in a clockwise direction to move the ICR lever a sufficient distance away from the ICR tape cassette 22 to allow removal of the ICR tape cassette 22 from the chassis 14.

From the foregoing, it will be noted that the improved telephone answering device of the present invention utilizes only a single motor 12 and a single solenoid 60 to provide all of the functions necessary to operate a completely functioning telephone answering device.

It is contemplated, of course, that numerous modifications, changes and/or additions may be made to the telephone answering device of the present invention without departing from the spirit and scope of the invention. Accordingly, it is intended that this patent be limited only by the scope of the appended claims.

It is also to be understood that various of the components of the telephone answering device of the present invention may be employed to advantage in various other recording/playback devices, other than telephone answering machines, and in other tape or band drive mechanisms, or other mechanisms or machines.

I claim:

1. A tape drive system for a recording mechanism, comprising:
   a reversible motor;
   a first drive capstan connected to the reversible motor for driving a first recording tape in a first direction when said reversible motor is operating in a first direction;
   a second drive capstan connected to the reversible motor for driving a second recording tape in a first direction when said reversible motor is operating in a first direction;
   a first pinch roller adapted to engage said first drive capstan when said reversible motor is rotating in a first direction to cooperate with said first drive capstan to drive a first recording tape in a first direction;
   a second pinch roller adapted to engage said second drive capstan to cooperate with said second drive capstan to drive a second recording tape in a first direction;
   disengaging means for disengaging said first pinch roller from said first drive capstan when said second pinch roller is in engagement with said second drive capstan and for disengaging said second pinch roller from said second drive capstan when said first pinch roller is in engagement with said first drive capstan; and means for rotating said first drive capstan in a second direction when said reversible motor is rotating in a second direction;
   said disengaging means including an eccentric disc member associated with said first pinch roller for moving said first pinch roller out of engagement with said first drive capstan when said reversible motor is driving said first drive capstan in a second direction; and a spring member connecting said eccentric disc member to said first pinch roller; said spring member providing relatively slight frictional engagement between said first pinch roller and said eccentric disc member.

2. A tape drive system for a recording mechanism, comprising:
   a reversible motor adapted to be selectively rotated in a first direction and a second direction;
   a drive capstan operatively connected to said reversible motor for rotating in a first direction when said reversible motor is operating in said first direction and rotating in a second direction when said reversible motor is rotating in said second direction;
   a pinch roller adapted to engage said drive capstan when said reversible motor is rotating in said first direction to cooperate with said drive capstan to drive a recording tape in a first direction;
   an eccentric disc member associated with said pinch roller for moving said pinch roller out of engagement with said drive capstan when said reversible motor and said drive capstan are rotating in said second direction; and
   a spring member connecting said eccentric disc member to said first pinch roller; said spring member providing relatively slight frictional engagement between said pinch roller and said eccentric disc.

3. A tape drive system for a recording mechanism, comprising:
   a reversible motor adapted to selectively rotate in a first direction and in a second direction;
   a first drive capstan connected to the reversible motor for driving a first recording tape in a first direction when said reversible motor is rotating in said first direction;
   a second drive capstan connected to the reversible motor for driving a second recording tape in a first direction when said reversible motor is rotating in said first direction;
   a pinch roller adapted to engage said first drive capstan when said reversible motor is rotating in said first direction to cooperate with said first drive capstan to drive a first recording tape in a first direction;
   a second pinch roller adapted to engage said second drive capstan to cooperate with said second drive capstan to drive a second recording tape in a first direction;
   a first lever pivotably mounted for movement toward and away from said first drive capstan; said first pinch roller being mounted on said first lever; spring means normally biasing said first lever toward said first drive capstan; and a solenoid member connected to said first lever for selectively moving said first lever away from said first drive capstan to move said first pinch roller away from said first drive capstan;
   a second lever pivotably connected to said first lever for movement toward and away from said second drive capstan; and spring means disposed between said first and second levers for normally biasing said second lever toward said second drive capstan; said second pinch roller being mounted on said second lever, whereby said second pinch roller will be moved toward said second drive capstan when said second lever is moved toward said second drive capstan;

a take-up turntable and spindle mechanism adapted to rotate a take-up reel of a reel-to-reel tape container and a supply turntable and spindle mechanism adapted to rotate a supply reel of a reel-to-reel tape container; and further including an automatic reversing mechanism for selectively rotating said take-up turntable and spindle when said reversible motor is operating in a first direction and said first pinch roller is out of engagement with said first drive capstan and for selectively rotating said supply turntable and spindle when said reversible motor is operating in a second direction; said automatic reversing means including a drive wheel for selectively contacting and rotating said take-up turntable or said supply turntable; and reversing means operatively connected between said reversible motor and said automatic reversing means for selectively moving said drive wheel into engagement with either said take-up turntable or said supply turntable depending upon the direction of rotation of said reversible motor.

4. A tape drive system according to claim 3, and further comprising means for maintaining said drive wheel in a neutral position, out of engagement with both said take-up turntable and said supply turntable when said first pinch roller is not in engagement with said first drive capstan.

5. A tape drive system according to claim 3 wherein said automatic reverse system includes a bracket in which said drive wheel is rotatably disposed; and wherein said means for maintaining said drive wheel in said neutral position includes a slidable push rod disposed between said first lever and said bracket of said automatic reversing mechanism.

6. An improved tape drive system for an apparatus employing two recording tape containers, comprising:
a base member adapted to removably support two recording tape containers;
a reversible motor and rotatable first and second tape drive flywheel connected to said base member for rotation relative thereto;
said reversible motor having a drive shaft extending therefrom;
an endless loop drive band wrapped around portions of said motor drive shaft and said first and second tape drive flywheels rotating said flywheels when said motor shaft is rotated;
an upstanding first tape drive capstan mounted on said first tape drive flywheel for rotation therewith;
an upstanding second tape drive capstan mounted on said second flywheel for rotation therewith;
a first lever pivotably mounted on said base member;
a first pinch roller mounted on said broadcast lever and adapted to engage said first tape drive capstan to drive a tape extending between said first pinch roller and said first drive capstan;
spring means normally biasing said first lever toward said first tape drive capstan to bias said first pinch roller into engagement with said first tape drive capstan;

a solenoid mounted on said base member; said solenoid including an actuator arm movable between an extended position and a retracted position for selectively pivoting said first lever to a retracted position wherein said first pinch roller is out of engagement with said first tape drive capstan;
a second lever pivotably mounted relative to said first lever;
a second pinch roller mounted on said second lever and adapted to drivingly engage said second tape drive capstan to drive a recording tape extending between said pinch roller and said drive capstan;
spring means biasing said second pinch roller toward said second tape drive capstan;
stop means for preventing said second pinch roller from engaging said second tape drive capstan when said solenoid actuator arm is in said extended position;
said spring means biasing said second pinch roller into engagement with said second pinch roller into engagement with said second tape drive capstan when said solenoid actuator arm is in its said retracted position.

7. An improved tape drive system for telephone answering apparatuses and the like, comprising:
a base member adapted to removably support a broadcast tape cassette and an incoming call recording tape cassette;
a reversible motor, a rotatable broadcast tape drive flywheel and a rotatable incoming call receiving tape drive flywheel all connected to said base member for rotation relative thereto;
said reversible motor having a drive shaft extending therefrom;
an endless loop drive band wrapped around portions of said motor drive shaft, said broadcast tape drive flywheel and said incoming call recording flywheel for rotating said flywheels when said motor shaft is rotated;
an upstanding broadcast tape drive capstan mounted on said broadcast tape drive flywheel for rotation therewith;
an upstanding incoming call recording tape drive capstan mounted on said incoming call receiving flywheel for rotation therewith;
a broadcast lever pivotably mounted on said base member;
a broadcast pinch roller mechanism mounted on said broadcast lever; said broadcast pinch roller mechanism including a pinch roller adapted to drivingly engage said broadcast tape drive capstan to drive a broadcast tape extending between said pinch roller and said drive capstan;
spring means normally biasing said broadcast lever toward said broadcast tape drive capstan to bias said broadcast pinch roller mechanism into engagement with said broadcast tape drive capstan;
a solenoid mounted on said base member; said solenoid including an actuator arm movable between an extended position and a retracted position for selectively pivoting said broadcast lever to a retracted position wherein said broadcast pinch roller mechanism is out of engagement with said broadcast tape drive capstan;
an incoming call recording lever pivotably mounted on said broadcast lever;
an incoming call recording pinch roller mounted on said incoming call recording lever and adapted to drivingly engage said incoming call recording tape drive capstan to drive an incoming call recording tape extending between said pinch roller and said drive capstan;

spring means between said first and second levers for biasing said incoming call recording pinch roller toward said incoming call recording tape drive capstan;

stop means on said broadcast lever and said incoming call recording lever for preventing said incoming call recording pinch roller from engaging said drive capstan when said solenoid actuator arm is in said extended position;

said spring means between said first and second levers biasing said incoming call recording pinch roller into engagement with said incoming call recording tape drive capstan when said solenoid actuator arm is in its said retracted position.

* * * * *